(12) United States Patent  (10) Patent No.: US 8,171,315 B2
Karam et al.  (45) Date of Patent: *May 1, 2012

(54) METHOD AND APPARATUS FOR CHANGING POWER CLASS FOR A POWERED DEVICE

(75) Inventors: Roger Karam, Mountain View, CA (US); Robert Thomas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/609,412

(22) Filed: Oct. 30, 2009

(65) Prior Publication Data

US 2010/0049998 A1 Feb. 25, 2010

Related U.S. Application Data

(63) Continuation of application No. 11/375,391, filed on Mar. 14, 2006, now Pat. No. 7,613,939.

(51) Int. Cl.
*G06F 1/00* (2006.01)
*G06F 1/26* (2006.01)
(52) U.S. Cl. ......... 713/300; 713/310; 713/320; 340/310
(58) Field of Classification Search .................. 713/300, 713/310, 320; 340/310
See application file for complete search history.

(56) References Cited

U.S. PATENT DOCUMENTS

| | | | |
|---|---|---|---|
| 6,218,930 B1 | 4/2001 | Katzenberg et al. | |
| 6,650,622 B1 | 11/2003 | Austerman, III et al. | |
| 6,686,831 B2 | 2/2004 | Cook et al. | |
| 6,819,937 B2 | 11/2004 | Knuutila et al. | |
| 7,053,501 B1 | 5/2006 | Barrass | |
| 7,154,381 B2 | 12/2006 | Lang et al. | |
| 7,162,377 B2 | 1/2007 | Amrod et al. | |
| 7,203,849 B2 | 4/2007 | Dove | |
| 7,240,224 B1 | 7/2007 | Biederman | |
| 7,404,091 B1 * | 7/2008 | Gere | 713/300 |
| 7,613,939 B2 * | 11/2009 | Karam et al. | 713/300 |
| 7,814,342 B2 * | 10/2010 | Hussain et al. | 713/300 |
| 2004/0201931 A1 * | 10/2004 | Korcharz et al. | 361/18 |
| 2005/0033997 A1 | 2/2005 | Boynton et al. | |
| 2005/0085212 A1 | 4/2005 | Peker et al. | |
| 2005/0268120 A1 * | 12/2005 | Schindler et al. | 713/300 |

(Continued)

OTHER PUBLICATIONS

Data Sheet: CISCO IP Phone Expansion Module 7914, Cisco Systems, Inc., 2005, 6 pages.
http://www.javvin.com/protocolCDP.html, "CDP: Cisco Discovery Protocol Overview," visited Jan. 29, 2006, 3 pages.
Rosales, Jesus, "Power Over Ethernet Isolated Power Supply Delivers 11.5W at 90% Efficiency," Design Note 338, Linear Technology Corporation advertisement, 2004, 2 pages.

(Continued)

*Primary Examiner* — Vincent Tran
(74) *Attorney, Agent, or Firm* — BainwoodHuang

(57) ABSTRACT

A method and apparatus for changing power class for a powered device are provided. During operation, a powered device, such as an IP telephone, receives power from a power source via a PoE device. In the event that the powered device detects connection to a second powered device, such as an IP telephone module, the powered device transmits a classification signal to the power source. Based upon the classification signal, the power source performs a powered device classification procedure to reclassify the powered device, such as according to an IEEE 802.3af standard, and provide an increase amount of power to the powered device. The powered device, in turn, provides a portion of the power to the modular device. The modular powered device, therefore, receives power directly from the first powered device and does not require additional equipment in order to operate.

19 Claims, 7 Drawing Sheets

U.S. PATENT DOCUMENTS

2006/0047880 A1 3/2006 Lindblom et al.
2006/0049818 A1 3/2006 Montgomery
2006/0080573 A1 4/2006 Biederman et al.
2006/0164098 A1 7/2006 Su
2006/0164769 A1 7/2006 Stanford

OTHER PUBLICATIONS

European Search Report from EP 07758397.9, mailed on Jul. 8, 2010.

* cited by examiner

150

152 MODULATE A CURRENT TO AN OVER CURRENT VALUE AND OVER A TIME INTERVAL THAT IS LESS THAN AN OVER CURRENT DURATION THRESHOLD, THE OVER CURRENT VALUE BEING INDICATIVE OF AN OVER CURRENT CONDITION IN THE FIRST POWERED DEVICE AND THE OVER CURRENT DURATION THRESHOLD BEING OF A DURATION THAT CAUSES THE POWER SOURCE TO CEASE TRANSMISSION OF POWER TO THE FIRST POWERED DEVICE

154 EXCHANGE, AS THE SECOND CLASSIFICATION SIGNAL, THE MODULATED CURRENT WITH THE POWER SOURCE

```
┌─────────────────────────────────────────────────────────────┐
│ 162 MODULATE A CURRENT TO AN UNDER CURRENT VALUE, THE       │
│      UNDER CURRENT VALUE APPROACHING ZERO AMPERES           │
└─────────────────────────────────────────────────────────────┘
                              │
                              ▼
┌─────────────────────────────────────────────────────────────┐
│ 164 EXCHANGE, AS THE SECOND CLASSIFICATION SIGNAL, THE      │
│              CURRENT WITH THE POWER SOURCE                  │
└─────────────────────────────────────────────────────────────┘
```

FIG. 6

METHOD AND APPARATUS FOR CHANGING POWER CLASS FOR A POWERED DEVICE

CROSS REFERENCE TO RELATED APPLICATIONS

This patent application is a Continuation of U.S. patent application Ser. No. 11/375,391 filed on Mar. 14, 2006, entitled, "METHOD AND APPARATUS FOR CHANGING POWER CLASS FOR A POWERED DEVICE", the contents and teachings of which are hereby incorporated by reference in their entirety.

BACKGROUND

Conventional networks typically include data communications devices that transmit data packets from one or more sources to one or more destinations. Data communications devices, such as routers, receive packets containing data and control information at input ports, and, based on destination or other information included in the packets, route the packets to appropriate output ports that lead to either another router or to the packet's final destination. Certain networks, such as Voice Over Internet Protocol (VOIP) networks, include multiple powered devices such as Internet-Protocol telephones (IP telephones) connected by one or more routers. These VOIP networks allow the IP telephones to send and receive audio, video, data, and other signals as Internet-Protocol signals.

The VOIP network can provide power to the IP telephones using a power source, such as a Power over Ethernet (PoE) device. For example, IP telephones typically connect to a router using RJ-45 connectors having four pairs of twisted pair conductors used to transmit data. In the VOIP networks, the PoE device injects power between the router and the IP telephones and transmits the power over the conductors of the RJ-45 connectors.

In use, the power source transmits a particular amount of power to the powered device based upon the power classification of the powered device as defined by the IEEE 802.3af standard. In one arrangement, IP telephones, such as IP telephones models 7960G, 7961G, 7970G, or 7971G-GE manufactured by Cisco Systems, Inc. of San Jose, Calif., each receive a particular amount of power from the PoE device during operation based upon the power classification of the telephone.

SUMMARY

The aforementioned IP telephones, such as manufactured by Cisco Systems, Inc., can be expanded with one or more modular powered devices, such as plug in modules, which provide additional functionality to the IP telephones. In one arrangement, the Cisco IP Phone Expansion Module 7914 can be attached to the above-listed Cisco IP telephones and provide additional functions to allow a user to monitor, manage, and cover various calls. For example, the module can include buttons that can be programmed as directory number (DN), line, or speed-dial keys.

There are, however, deficiencies with respect to providing power to typical powered devices, such as IP telephones, using PoE. For example, as described, the IP telephones models 7960G, 7961G, 7970G, or 7971G-GE manufactured by Cisco Systems, Inc. each draw a set amount of power from the PoE device based upon the telephone's power classification. This set amount of power is sufficient to allow operation of the IP telephone. When a plug-in module is attached to the IP telephone, if the module were to receive power from the PoE device, the combined power draw of the IP telephone and the module would be greater than the amount of power allocated to allow operation of the IP telephone by itself. Therefore, plug-in modules are typically powered from a local power supply and require additional equipment, such as a bulky power cube and cord, in order to operate. Additionally, the module must be located in the vicinity of an external power supply, such as a wall outlet, which limits the location in which the IP telephone and module can be used.

By contrast to conventional powered devices, embodiments of the invention are directed to a method and apparatus for changing power class for a powered device, before or after the device power increases. During operation, a first powered device, such as an IP telephone, receives power from a power source via a PoE device. In the event that the first powered device detects connection to a second powered device, such as an IP telephone module, the first powered device transmits a classification signal to the power source. Based upon the classification signal, the power source performs a powered device classification procedure to reclassify the first powered device, such as according to an IEEE 802.3af standard, and provide an increase amount of power to the first powered device. The first powered device, in turn, provides a portion of the power to a second powered device. The second powered device, therefore, receives power directly from the first powered device and does not require additional equipment in order to operate.

One embodiment of the invention relates to a method for providing power to a second powered device by a first powered device where the first powered device is configured to receive a first amount of power from a power source, via a communication medium, based upon a first classification signal provided to the power source by the first powered device. The method includes detecting an electrical coupling of a second powered device to the first powered device and providing a second classification signal to the power source based upon the electrical coupling of the second powered device. The method further includes receiving a second amount of power from the power source, via the communication medium, based upon the second classification signal, the second amount of power being greater than the first amount of power, and providing a portion of the second amount of power to the second powered device. In this arrangement, the second powered device receives power directly from the first powered device such as by a PoE mechanism. As a result, a second powered device does not require additional equipment, such as a bulky power cube and cord, in order to operate.

In one arrangement, a powered device is configured to receive a first amount of power from a power source, via a communication medium, based upon a first classification signal provided by the power source to the powered device. The powered device is operable to detect an electrical coupling of a modular powered device to the powered device and provide a second classification signal to the power source based upon the electrical coupling of the modular powered device. The powered device is also operable to receive a second amount of power from the power source, via the communication medium, based upon the second classification signal, the second amount of power being greater than the first amount of power, and provide a portion of the second amount of power to the modular powered device.

One embodiment of the invention relates to a method for providing power to a powered device by a power source. The method includes providing a first amount of power to a powered device and receiving a classification signal from the powered device, the classification signal representing a request for a second amount of power, the second amount of power being greater than the first amount of power. The method also includes performing a powered device classification procedure to detect (i) a power classification of the powered device and (ii) a second amount of power corresponding to the power classification of the powered device, and transmitting the second amount of power to the powered device. In this arrangement, the power source can dynamically change the power classification for a powered device and provide an amount of power to the powered device corresponding to the classification. As such, the configuration of the powered device allows IP telephone plug-in modules to be connected to, and to receive power from, associated IP telephones, for example.

In one arrangement, a power source is configured to provide power to a powered device, the power source having a controller configured to provide a first amount of power to the powered device and receive a classification signal from the powered device, the classification signal representing a request for a second amount of power, the second amount of power being greater than the first amount of power. The power source is also configured to perform a powered device classification procedure to detect (i) a power classification of the powered device and (ii) a second amount of power corresponding to the power classification of the powered device and transmit the second amount of power to the powered device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a flowchart that illustrates a procedure performed by the first powered device when providing a classification signal to the power source by modulating current to an over current condition, according to one embodiment of the invention.

FIG. 6 is a flowchart that illustrates a procedure performed by the first powered device when providing a classification signal to the power source by modulating current to an under current condition, according to one embodiment of the invention.

DETAILED DESCRIPTION

Embodiments of the invention are directed to a method and apparatus for changing power class for a powered device.

During operation, a first powered device, such as an IP telephone, receives power from a power source. In the event that the powered device detects connection to a second powered device or modular powered device, such as an IP telephone module, the first powered device transmits a classification signal to the power source. Based upon the classification signal, the power source performs a powered device classification procedure to reclassify the first powered device, such as according to an IEEE 802.3af standard, and provides an increased amount of power to the first powered device. The first powered device, in turn, provides a portion of the power to the modular powered device. The modular powered device, therefore, receives power directly from the first powered device and does not require additional equipment in order to operate.

Figure 1:
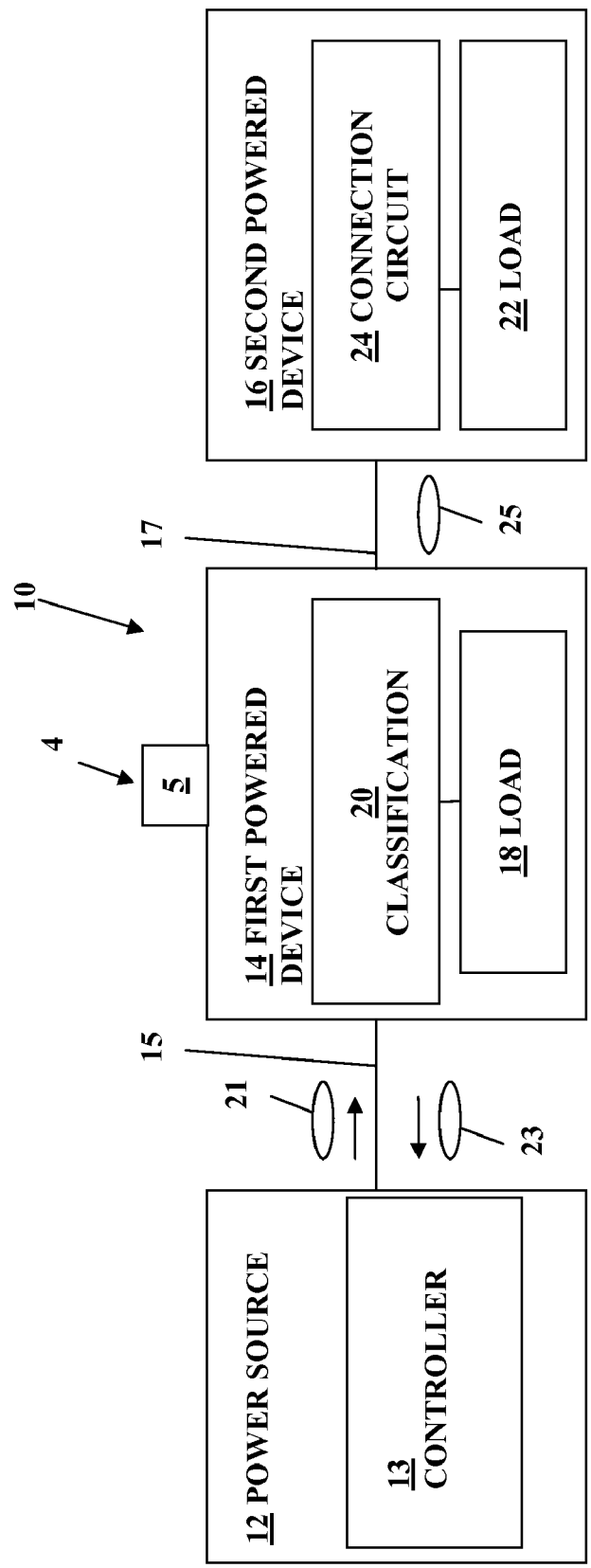
FIG. 1 illustrates a block diagram of a data communications network, according to one embodiment of the invention.

FIG. 1 illustrates a block diagram of a data communications network or system 10, according to one embodiment of the invention. As illustrated, the network 10 includes a power source 12, a first powered device 14, and a second or modular powered device 16 that is electrically coupled to the first powered device 14. The network 10 can be configured as a Voice Over Internet Protocol (VOIP) network that allows powered devices 14, 16, such as IP telephones, to send and receive audio, video, and other data signals as Internet-Protocol signals. The VOIP network can also provide power to the powered devices 14, 16 using power injection or Power Over Ethernet (POE) devices. For example, in the network 10, the power source 12 exchanges data signals with the first and second powered devices 14, 16 and transmits power signals to the first powered device 14 and also to the second powered device 16 via the first powered device 14.

The power source 12, in one arrangement, is configured as a subsystem of a data communications device, such as a router, switch, or hub, that provides power to one or more powered devices during operation via one or more ports. For example, the power source 12 connects to the first powered device 14 via a multiple-conductor-pair cable 15, such as a Category 5/6 unshielded twisted pair cable commonly used for Ethernet communications, and provides both data and power signals to the device 14 via the cable 15. The power source 12 includes a controller 13, such as a LTC4259A-1 Quad IEEE 802.3af Power over Ethernet Controller (Linear Technology, Milpitas, Calif.) configured to perform a powered device classification procedure in order to provide an appropriate amount of power to an attached powered device. For example, the controller 13 can identify the IEEE 802.3af power classification of either the first powered device 14 or a combination of the first powered device 14 and one or more modular powered devices 16 based upon a classification signal 23 transmitted by the first powered device 14. After classifying the powered device 14, based upon the signal 23, the power source 12 transmits an appropriate amount of power, such as power signal 21, thereto.

In one arrangement, the controller 13 of the power source 12 can be configured with look-up tables, such as presented in the Appendix, that allow the power source 12 to perform the powered device classification procedure. For example, when the power source 12 receives a current of 8 mA from the first powered device 14 as the classification signal 23, the controller 13 performs a look-up in Powered Device Classifications table, presented as Table 1, to determine the appropriate power classification for the first powered device 14. According to Table 1, based upon an 8 mA classification signal 23, the controller 13 can classify the first powered device 14 as a Class 1 device. The controller 13 can then perform a look-up in a Power Delivery table, presented as Table 2, in order to determine the appropriate amount of power 21 to deliver to the first powered device 14 based upon its classification. For example, according to the classification of the first powered device 14 as a Class 1 device, the power source 12 can deliver a minimum of 4.0 Watts of power to the first powered device 14. The power source 12 can also be configured to use classification signals 23 for power budgeting only (i.e., to keep track of the power that it can supply at any time) to enable the delivery of power levels that are larger than a preset maximum.

TABLE 33

3-Power classifications

| Class | Usage | Minimum power levels at output of PSE | Maximum power levels at input of PD |
|---|---|---|---|
| 0 | Default | 15.4 Watts | 0.44 to 12.95 Watts |
| 1 | Optional | 4.0 Watts | 0.44 to 3.84 Watts |
| 2 | Optional | 7.0 Watts | 3.84 to 6.49 Watts |
| 3 | Optional | 15.4 Watts | 6.49 to 12.95 Watts |
| 4 | Reserved for future use | Treat as Class 0 | Not allowed - Reserved for future use |

4-PD classification

| Measured $I_{Class}$ | Classification |
|---|---|
| 0 mA to 5 mA | Class 0 |
| >5 mA and <6 mA | May be Class 0 or 1 |
| 8 mA to 13 mA | Class 1 |
| >13 mA and <16 mA | May be Class 0, 1 or 2 |
| 16 mA to 21 mA | Class 2 |
| >21 mA and <25 mA | May be Class 0, 2 or 3 |
| 25 mA to 31 mA | Class 3 |
| >31 mA and <35 mA | May be Class 0, 3 or 4 |
| 35 mA to 45 mA | Class 4 |
| >45 mA and <51 mA | May be Class 0 or 4 |

The first powered device 14, such as an IP telephone, includes a load 18 and classification circuitry 20. The load 18 includes powered elements associated with the powered device 14 that require some amount of power for operation. For example, the load 18 can include a display screen, a speaker, a status light, or a voice transducer or microphone. The classification circuitry 20 is configured to generate a classification signal 23 for transmission to the power source 12. Based upon the classification signal 23 generated, the first powered device 14 receives a particular amount of power from the power source 12. In one arrangement, the classification signal 23 can identify the IEEE 802.3af power classification of either the first powered device 14 by itself, or the combination of the first powered device 14 as electrically coupled to one or more modular powered devices 16. For example, when the modular powered device 16 electrically couples to the first powered device 14, the first powered device 14 transmits the classification signal 23 to indicate a change in the classification of the first powered device 14 and request an increase in the amount of power provided by the power source 12. This increase can be a virtual increase since the power source 12 can be designed to supply a minimum amount of power equal to or greater than an amount defined for a particular power class according to the IEEE 802.3af standard and the power source 12 can use the classification signal 23 from the first powered device 14 for power accounting purposes (i.e., to determine how much power is left for other attached devices on a multi-port POE enabled Ethernet switch while enabling the first powered device 14 to change its power requirement first and notify the power source 12 soon after. When the first powered device 14 receives the increased amount of power from the power source, the device 14 delivers a portion of the power to the modular powered device 16. While the first powered device 14 can be any IP telephone from any IP telephone manufacturer, in one arrangement, the first powered device 14 is configured as an IP telephone manufactured by Cisco Systems, Inc. of San Jose, Calif., such as models 7960G, 7961G, 7970G, or 7971G-GE.

The modular powered device 16 is configured to electrically couple to the first powered device 14, such as by a cable 17, to enhance the functionality of the device 14. For example, in the case where the modular powered device 16 is an IP telephone expansion module, the device 16 includes a load 22, such as a display screen, a speaker, or one or more status lights, that requires some amount of power for operation. The modular powered device 16 also includes connection circuitry 24 that is configured to transmit a connection signal 25 to the classification circuitry 20 of the first powered device 14. Based upon the presence or absence of the connection signal 25, the first powered device 14 can detect the presence or absence of a connection to the modular powered device 16 and, in response to detecting the presence of the modular powered device 16, initiate transmission of the classification signal 23 to the power source 12 to indicate a change in the classification of the first powered device 14. While the second powered device 16 can be any IP telephone expansion module from any IP telephone manufacturer, in one arrangement, the modular device 16 is a Cisco IP Phone Expansion Module 7914 that includes additional programmable buttons and displays.

In use, when the first powered device 14 is initially coupled to the power source 12, the classification circuit 20 of the device 14 generates a first classification signal and transmits the classification signal to the power source 12. For example, in one arrangement, the classification circuit 20 generates a current as the classification signal 23, such as a current of 8 mA. After receiving the classification signal 23, the controller 13 of the power source 12 performs a powered device classification procedure to classify the first powered device 14 according to IEEE 802.3af power classification protocols, for example. Based upon the results of the classification, the powers source 12 transmits a minimum amount of power to the first powered device 14 that corresponds to the power classification of the first powered device 14.

Figure 2:
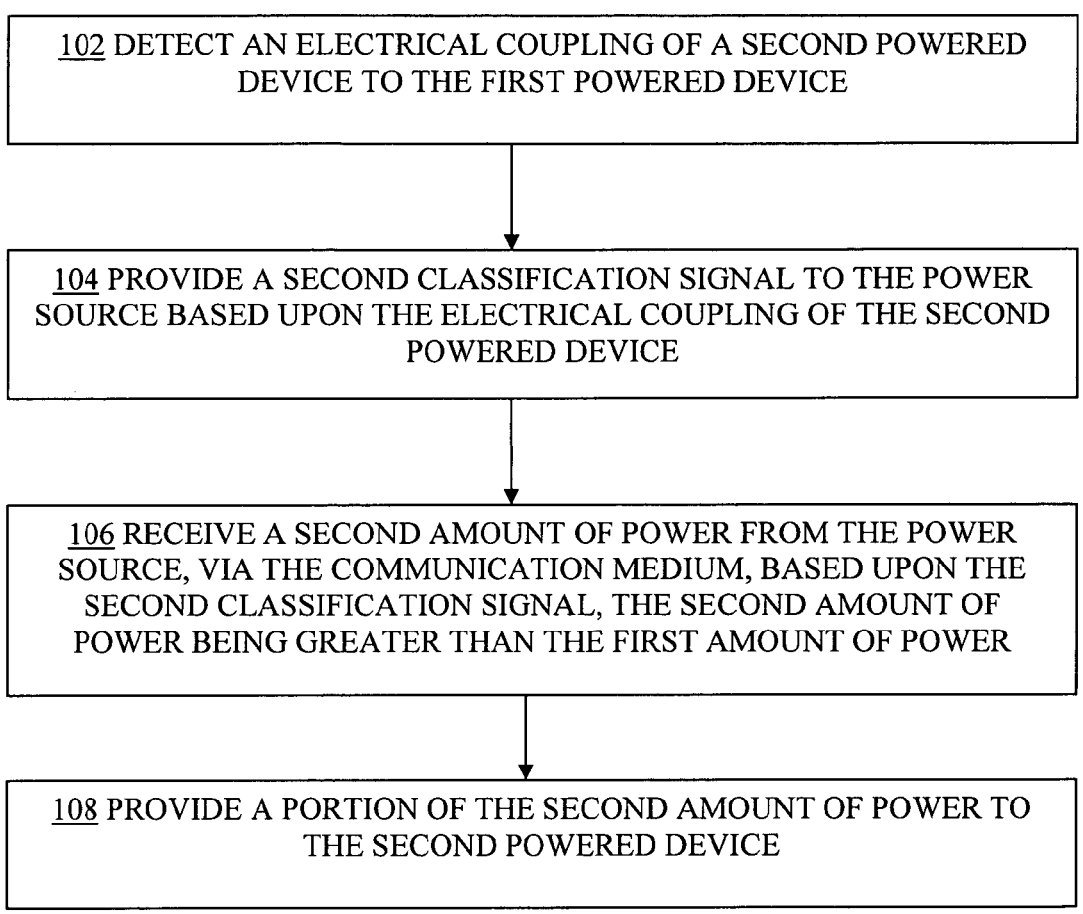
FIG. 2 is a flowchart that illustrates a procedure performed by a first powered device for providing power to an electrically connected second powered device, according to one embodiment of the invention.

After the power source 12 performs the initial power classification procedure and provides the power 21 to the first powered device 14 based upon this classification, in one arrangement, the power source 12 does not monitor the powered device 14 for changes in its power requirements. In such an arrangement, the first powered device 14 and power source 12 operate in conjunction with each other to validate a change in the power classification of the device 14 when one or more second powered devices 16 are attached to the device 14. As a result of such a change, the power source 12 can increase the amount of power delivered to the first powered device. FIG. 2 is a flowchart 100 that illustrates a procedure performed by the first powered device 14 for providing power to an electrically connected second powered device 16.

In step 102, the first powered device 14 detects an electrical coupling of the second powered device 16 to the first powered device 14. For example, the classification circuit 20 is configured to detect a presence or an absence of a connection signal 25 generated by the modular powered device 16. When the modular powered device 16 electrically couples to the first powered device 14 via the cable 17, the connection circuitry 24 of the modular powered device 16 generates the connection signal 25 and transmits the signal to the first powered device 14. In such a case, the classification circuit 20 would detect the connection of the modular powered device 16 via the connection signal.

In step 104, the first powered device 14 provides a second classification signal 23 to the power source 12 based upon the electrical coupling of the second powered device 16. In one arrangement, the classification circuit 20 of the first powered device 14 transmits the second classification signal 23 to the power source 12 to cause the power source 12 to reclassify the first powered device 14 using the powered device classification procedure. Based upon the reclassification, the power source 12 can provide an increased amount of power 21 to the first powered device 14. Details regarding various embodiments of the classification signal 23 and the powered device classification procedure are provided below with respect to FIGS. 4-7, for example.

In step 106, the first powered device 14 receives a second amount of power 21 from the power source 12 based upon the second classification signal 23 where the second amount of power is greater than the first amount of power. For example, the first powered device 14 receives the increased amount of power via a PoE device associated with the power source 12 over the twisted pair cable 15.

In step 108, the first powered device 14 provides a portion of the second amount of power 21 to the second powered device 16. As a result, the modular powered device 16 receives power directly from the first powered device 14 for operation. As a result, the modular powered device 16 does not require additional equipment, such as a bulky power cube and cord, in order to operate. Additionally, the modular powered device 16 does not need to be located in the vicinity of an external power supply, such as a wall outlet, in order to operate.

As indicated above, when the first powered device 14 detects an electrical connection to the second powered device 16, the first powered device 14 provides a classification signal to the power source 12 to cause the power source 12 to adjust the power classification of the first powered device 14 and provide additional power to the device 14. There are two situations when the modular powered device 16 can be attached to the first powered device 16: either when the first powered device is "off" and does not receive power from the power source 12 or when the first powered device is "on" and receives power from the power source 12. The first powered device 14 and the modular powered device 16 are configured to allow for reclassification of the first powered device 14 in either situation.

Figure 3:
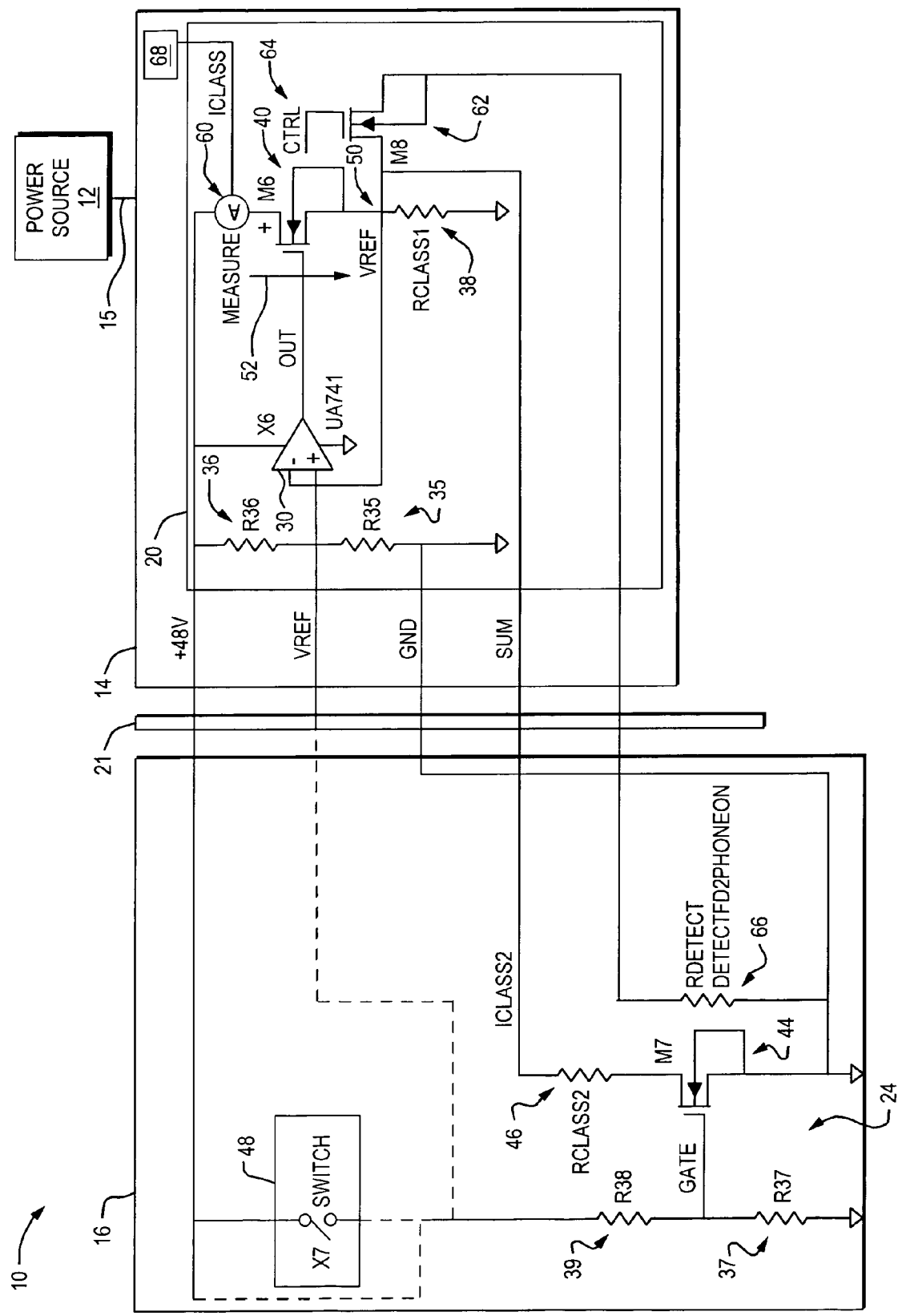
FIG. 3 illustrates a schematic diagram of the data communications network of FIG. 1, according to one embodiment of the invention.

FIG. 3 illustrates an embodiment of the first and second powered devices 14, 16 that allows connection of the second or modular powered device 16 to the first powered device 16 when the first powered device 14 is "off" and has not been classified by, or does not receive power from, the power source 12.

As illustrated, the first powered device includes classification circuitry 20, that includes, by way of example only, an operational amplifier 30 configured to convert voltage to current, resistors 35, 36 configured as a voltage divider, a first classification resistor (RCLASS1) 38, and a field-effect transistor (FET) gate 40. The second powered device 16 includes connection circuitry 24, including resistors 37, 39 configured as a voltage divider, a FET gate 44, a second classification resistor (RCLASS2) 46, and a manually or electrically operated switch 48. In one arrangement, the classification circuitry 20 can be embodied as a LTC4257-1 IEEE 802.3af Power over Ethernet Interface Controller (Linear Technology, Milpitas, Calif.). Zener references or other circuitry can be used as part of the classification circuitry 20 as well. Additionally, one of ordinary skill in the art will understand that the switch 48 can be configured as (e.g., replaced with) a hard short, a software switch, or any equivalent combination of hardware and software.

In the case where the first powered device 14 is "off" the modular powered device 16 is connected to the first powered device 14 via cable 21 and the first powered device 14 is then activated. Once activated (turned "on") the power source 12 provides an initial voltage to the first powered device 14 to allow the device 14 to initiate the powered device classification procedure. For example, when turned "on" the power source 12 provides an initial voltage of 17V to the classification circuitry 20 of the device 14. The voltage divider resistors 35, 36 divide this voltage in half such that the operational amplifier 30 receives 8.5V at an input "+". As a result, the operational amplifier 30 provides an 8.5V signal as a reference voltage at node 50 and establishes a current 52 within FET 40 equal to the reference voltage at the node 50 divided by the resistance of the first classification resistor 38.

Also as the first powered device 14 is activated, a voltage is applied, within the second powered device 16 to the FET gate 44 through the voltage divider resistors 37, 39. In one arrangement, the voltage, such as a voltage of 17V, is applied to the resistors 37, 39 when the switch 48 is engaged (e.g., closed. As a result of application of the voltage, the gate 44 moves from a closed state to an opened state, thereby allowing current to pass through the second classification resistor 46. As such, the second classification resistor 46 is placed in parallel with the first classification resistor 38 of device 14 to increase the current 52 within the FET 40. With this configuration, the amount of current flowing through the FET 40 is equal to the sum of the reference voltage (Vref) at the node 50 divided by the resistance of the first classification resistor 38 and the reference voltage at the node 50 divided by the resistance of the second classification resistor 46 (e.g., Vref/RCLASS1+ Vref/RCLASS2). In other words, the resistor 46 reduces the value of the total resistance at the summing node 50 of the operational amplifier 30 and increases the current 52 drawn through the gate 40 during the classification procedure. This increased current is provided to the power source 12 as the classification signal 23, thereby causing the power source 12 to classify the first powered device 14 in a different power class and provide an additional amount of power thereto.

With respect to the power classification procedure performed by the power source 12, in one example, assume that when first powered device 14 is connected to the modular powered device 16, a current 52 of 16 mA flows through the gate 40. Based upon this current 52 (e.g., where the current 52 is used as the classification signal 23) and according to the Tables provided in the Appendix, the power source 12 classifies the first powered device 14 (e.g. the combination of the first powered device 14 and the second powered device 16) as a Class 2 powered device. As a result, the power source 12 can provide a minimum of 7.0 W to the first powered device 14.

As indicated above, the modular powered device 16 can be attached to the first powered device 14 when the first powered device 14 is "off" and does not receive power from the power source 12. When the first powered device 14 detects an electrical coupling of the modular powered device 16 to the first powered device 14, the first powered device 14 then provides a classification signal 23 to the power source 12 to cause the power source 12 to reclassify the first powered device 14 and provide additional power to the device 14. In another arrangement, the modular powered device 16 can be attached to the first powered device 16 when the first powered device is "on" and receives power from the power source 12.

In one arrangement, in order to transmit a classification signal to the power source 12 when the modular powered device 16 is attached to the first powered device 16 when the first powered device 16 is "on", the second powered device 14 can be configured with a reset function. For example, when the modular powered device 16 electrically connects to the first powered device 14, the device 16 can draw a minimal amount of power from the first powered device 14 to allow activation of the reset function, such as by actuation of a switch or typing of a code into the second powered device 16. Such activation causes the first powered device 14 and/or the modular powered device 16 to go through a power cycle procedure (e.g., power down then power up) and initiate a new detection and classification cycle, described above with respect to FIG. 2. This allows a graceful and controlled power cycling process and re-configuration of the data speed and power requirement under user control at a time of his choosing.

In another arrangement, when the modular powered device 16 is attached to the first powered device 16 when the first powered device 16 is "on", the first powered device 14 can utilize common mode communication or current modulation in order to request additional power from the power source 12. Details regarding common mode communication are described in the U.S. patent application entitled "Inline Power-Based Common Mode Communication in a Wired Data Telecommunications Network", Ser. No. 10/961,904 the contents of which are incorporated by reference in their entirety.

Figure 4:
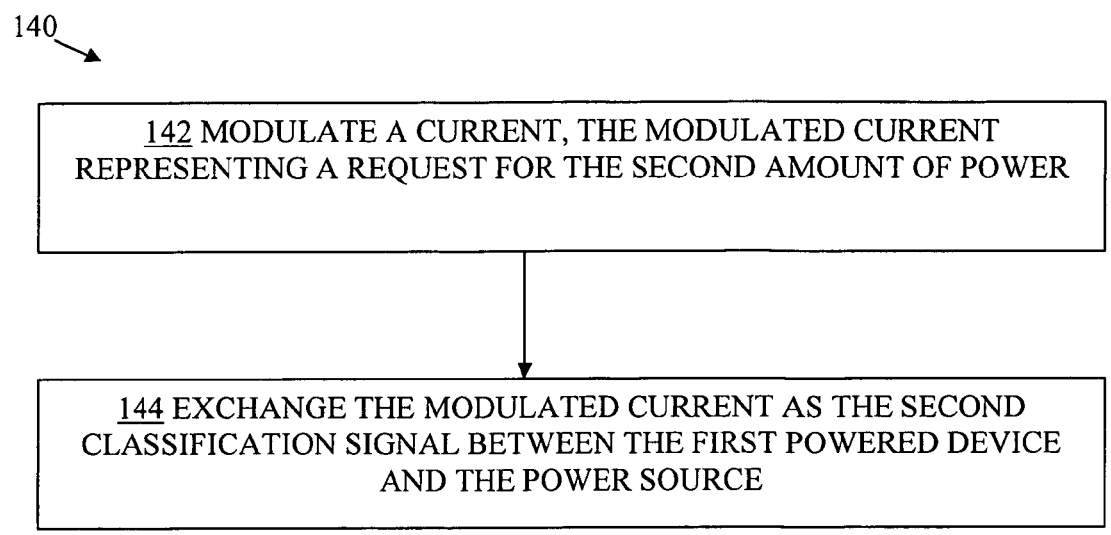
FIG. 4 is a flowchart that illustrates a procedure performed by the first powered device when providing a classification signal to the power source utilizing common mode communications, according to one embodiment of the invention.

FIG. 4 is a flowchart 140 that illustrates a procedure performed by the first powered device 14 when providing a classification signal 23 to the power source 12 using current modulation.

In step 142, when using common mode communication, the first powered device 14 modulates a current drawn from the power source 12 where the modulated current represents a request for an additional amount of power. In one arrangement, the powered device 14 modulates the current between a set upper and lower limit. For example, the upper limit can be set below an over current threshold and the lower limit can be set above an under current threshold to prevent the power source 12 from detecting a failure of the device 14. The modulation of the current generates a series of pulses to form a "code" representing a request for additional power from the power source 12. For example, assume the powered device 14 draws a current of 50 ma from the power source. In such a case, the powered device 14 can provide three "pulses" of current to the power source 12 by modulating the current between 55 ma and 45 ma for a duration of 10 msec per modulation cycle and for a total of three cycles.

In step 144, the powered device 14 exchanges the modulated current, as a classification signal 23, with the power source 12. For example, the modulated current is exchanged over the cable 15. As a result of the exchange, the power source 12 can decode the pattern of the pulses to detect the request for additional power. In one arrangement, the power source 12 can be configured with a look-up table that provides a correspondence between the number and duration of pulses received by the power source 12 and a corresponding amount of power to be provided to the first powered device 14. For example, when the power source 12 receives three modulation cycles of current modulated between 55 ma and 45 ma for a duration of 10 msec per modulation cycle, the look-up table can indicate that this pattern corresponds to a requirement of an additional 3 W of power by the first powered device 14.

In another arrangement, when the modular powered device 16 is attached to the first powered device 16 when the first powered device 16 is "on", the first powered device 14 can modulate a current to an over current condition and exchange the over current, as the classification signal 23, with the power source 12. Conventional power sources are configured to detect an over current condition (e.g., a draw of current greater than a preset threshold) in a powered device for a particular time interval, such as an interval of 10 msec, in order to detect a short circuit or failure of the device. When an over current condition is detected, the power source 12 typically ceases to provide power to the powered device 14. It should be noted that the IEEE 802.3af standard calls for an over current limit to be designed between 350 ma and 400 ma after power is applied. As the amplitude of the current drawn exceeds this maximum current, typically a 375 ma threshold for a specified time of between 50-75 msec and typically centered midway at 63 msec, the power is cutoff because a fault is detected. In the present embodiment, such a threshold is exceeded for a time much less than the 50 msec minimum specified at a pre-defined interval in time for a number of cycles to indicate a need to have the power requirements increased and/or decreased or to enable the controller of the power source 12 to detect such a change in order to execute a power re-budgeting procedure defined in a software algorithm. The present powered device 14 takes advantage of this existing configuration of the power source 12 by modulating a current to an over current condition for a duration of time that is less than the preset threshold. As such, the power source 12 can detect an over current condition in the powered device 14 without detecting the over current condition as a short circuit or failure of the device 14. As such, the first powered device 14 can communicate a need for additional power with the power source 12 without requiring that the power source 12 include additional circuitry.

FIG. 5 is a flowchart 150 that illustrates a procedure performed by the first powered device 14 when providing a classification signal to the power source 12 using over current modulation.

In step 152, the first powered device 14 modulates a current to an over current value and over a time interval that is less than an over current duration threshold. The over current value is indicative of an over current condition in the powered device 14. The modulation of the current generates a series of pulses to form a "code" representing a request for additional power from the power source 12. In one arrangement, the over current value is greater, by a pre-defined percentage, than an amount of current drawn by the first powered device 14 for its pre-established power classification. For example, if the first powered device 14 draws 100 ma from the power source 12, the current can have an over current value of 110 ma such that the over current value is 10% greater than the amount of current drawn by the first powered device. When modulating, the first powered device 14 "pulses" the over current signal for time intervals that are less than the duration threshold or preset time interval associated with the power source 12. For example, assume that if the power source 12 detects an over current condition in the powered device 14 for a time period greater than 10 ms (e.g., the over current duration threshold), the power source 12 is configured to cease delivery of power to the powered device 12. As such, the powered device 14 can modulate the current to generate three over current signals to the power source 12 at intervals of 10 msec and for a duration of 5 msec each.

In step 154, the first powered device 14 exchanges, as the classification signal, the current with the power source 12. As a result of the exchange, the power source 12 can decode the pattern of the pulses of the over current signal to detect the request for additional power. In one arrangement, the power source can be configured with a look-up table that provides a correspondence between the number and duration of over current pulses received and an amount of power to be provided to the first powered device 14. For example, when the power source 12 receives three over current signals at intervals of 10 msec and for a duration of 5 msec each, the look-up table can indicate that this pattern corresponds to a requirement of an additional 3 W of power by the first powered device 14.

In another arrangement, when the modular powered device 16 is attached to the first powered device 16 when the first powered device 16 is "on", the first powered device 14 can modulate a current to an under current value, to generate a classification signal, in order to request additional power from the power source 12. Conventional power sources are configured to provide continually power to a powered device when an under current condition exists in the device for a particular time interval (e.g., when the current draw by the device falls below a minimum threshold). For example, under the IEE 802.3af standard a power source will continue to provide power to a powered device when the DC current drawn by the powered device dips below a minimum of 5 ma for a period of time of approximately 60 msec. Such a configuration of the power source allows a low power device to maintain a power connection with the power source while the device draws less than the 5 ma of current required. The present powered device 14, however, cyclically modulates a current to indicate, to the power source 12, that the first powered device 14 requires additional power, as caused by addition of the modular device 16. As such, the first powered device 14 can communicate a need for additional power with the power source 12 without requiring that the power source 12 include additional circuitry. In other words, the first powered device 14 utilizes the existing configuration of the power source 12 to communicate a need for additional power.

FIG. 6 is a flowchart 160 that illustrates a procedure performed by the first powered device 14 when providing a classification signal to the power source 12 using under current modulation.

In step 162, the powered device 14 modulates a current to an under current value where the under current value approaches zero amperes (e.g., where the under current value is substantially equal to zero). In one arrangement, the under current can have a value that is less than the amount of current drawn by the first powered device 14 for its pre-established power classification. For example, if the first powered device 14 draws 10 ma from the power source 12, the under current value can be 1 ma or 2 ma. Additionally, the first powered device 14, in one arrangement, "pulses" the under current signal to the power source 12 for time intervals that are less than the duration threshold or preset time interval. For example, the first powered device 14 can transmit three under current signals to the power source 12 at intervals of 10 msec and for a duration of 5 msec each.

In step 164, the powered device 14 exchanges, as the classification signal, the current with the power source 12. As a result of the exchange, the power source 12 can decode the pattern of the pulses of the under current signal to detect the request for additional power. During such exchanges, the device 14 remains powered using an available charge on a local capacitor or some auxiliary power source. In one arrangement, the power source 12 can be configured with a look-up table that provides a correspondence between the number and duration of under current pulses received and an amount of power to be provided to the first powered device 14. For example, when the power source 12 receives three under current signals at intervals of 10 msec and for a duration of 5 msec each, the look-up table can indicate that this pattern corresponds to a requirement of an additional 3 W of power by the first powered device 14.

In another arrangement, when the modular powered device 16 is attached to the first powered device 16 when the first powered device 16 is "on", the first powered device 14 can utilize an auto-negotiation procedure to request additional power from the power source 12. Auto-negotiation is a mechanism, specified in the IEEE 802.3 specifications, that provides automatic connection between devices, such as a switch and an IP telephone, over a twisted pair cable connecting the devices, such as cable 15.

Figure 7:
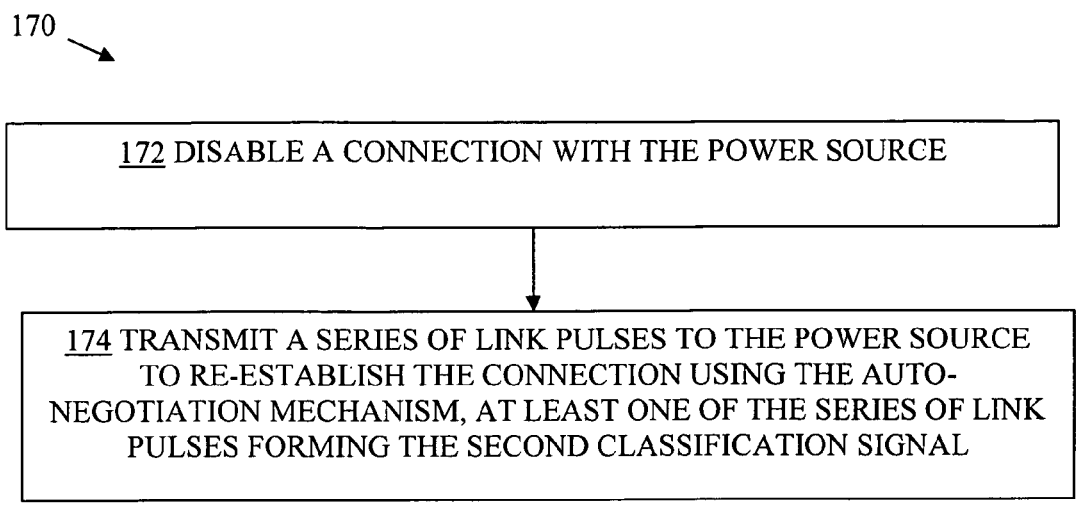
FIG. 7 is a flowchart that illustrates a procedure performed by the first powered device when providing a classification signal to the power source using auto-negotiation, according to one embodiment of the invention.

FIG. 7 illustrates a flowchart 170 that illustrates a procedure performed by the first powered device 14 when providing a classification signal to the power source 12 using auto-negotiation.

In step 170, the first powered device 14 disables a connection with the power source 12, such as a communications and power connection with the power source. In one arrangement, once the first powered device 14 detects attachment of the second powered device 16, the first powered device 14 can raise a "link down" flag and force the power source to recognize the "link down" flag in order to disable the connection. For example, when the first powered device 14 detects attachment of the second powered device 16, the first powered device 14 can automatically generate the "link down" flag to disable connection with the power source 12. Alternately, when the first powered device 14 detects attachment of the second powered device 16, the device 14 can require user input to generate the "link down" flag. For example, the first powered device 14 can include user circuitry 4 such as a user-actuatable switch 5 that disables the connection with the power source 12. When the first powered device 14 detects attachment of the second powered device 16, the device 14 can inform the user of such connection, via a display, and instruct the user to manually actuate the switch 5. One of ordinary skill in the art will understand that while this step can be performed when the device 14 is in the process of exchanging data with other devices in the network 10 (e.g., during a telecommunications session between the first powered device 14 another powered device coupled to the network), when the connection becomes disabled, any data exchange between the device 14 and the power source 12 will cease, thereby abruptly ending the data exchange session.

In step 172, the first powered device 14 transmits a series of link pulses to the power source to re-establish the connection using the auto-negotiation mechanism, at least one of the series of link pulses forming the second classification signal. For example, the auto-negotiation mechanism allows the first powered device 14 and the power source 12 to negotiate data transmission speeds and transmission modes (e.g., duplex mode) during a synchronization procedure using series of link pulses which encode a 16 bit word, known as a Fast Link Pulse (FLP) Burst. In one arrangement, at least one of the series of link pulses includes a next page bit and a next page message. The next page bit identifies, to the power source 12, the presence of the next page message during auto-negotiation. The next page message is a signal formed as a series of pulses that encode a request that the powered device 12 perform a power device classification procedure to provide additional power to the device 14.

For example, when the power source 12 receives the next page message, the power source 12 can "decode" the pulses to detect that the first powered device 14 requires additional power. For example, the power source 12 can be configured with a look-up table that provides a correspondence between the pulses provided in the next page message and an amount of power to be provided to the first powered device 14. Once the powered device 12 detects the correspondence, the powered device 12 can provide the appropriate amount of power to the first powered device 14.

As described above, the first powered device 14 is configured to detect attachment of the modular powered device 16. In one arrangement, the first and second powered devices 14, 16 are each configured with communication modules, such as digital communication controllers, to allow the first device 14 to detect the connection of the second device 16 when the first device is "on." For example, each communication module can be configured to exchange messages over the cable 21 when the devices 14, 16 are attached. As such, the first device 14 can recognize attachment of the second device 16 and generate a classification signal to request additional power from the power source 12.

In another arrangement, the first device 14 includes a detection mechanism configured to detect connection of the second device 16. While such a detection mechanism can be configured in a variety of ways, FIG. 3 illustrates one embodiment of the detection mechanism. For example, as illustrated, the classification circuit 20 of the first powered device 14 includes a FET or gate 62 having a control element 64, a current measuring circuit 60, acting as an ammeter, and detection circuitry 68 electrically coupled to the current measuring circuit 60.

The control element 64 controls operation of the gate 62 in response to an amount of current passing through the node 50. In one arrangement, the control element 64 maintains the gate 62 in an open state when a relatively small amount of current passes through the node 50 and maintains the gate 62 in a closed state when a relatively large amount of current passes through the node 50. The current measuring circuit 60 is configured to measure the current at the node 50 and transmit a current value to the detection circuitry 68. The detection circuitry 68 is configured to compare the current value to a threshold value to detect the presence or absence of a connection to the second powered device 16.

In use, in the case where the second powered device 16 is not connected to the first device 14, the amount of current passing through the node 50 can be relatively small (e.g., equivalent to the current output of the operational amplifier 30). As such, the control element 64 maintains the gate 62 in an open state and the current measuring circuit 60 measures the current passing through the node 50 as Vref/RCLASS1. In this case, when the detection circuitry 68 compares this current with a threshold current, the circuitry 68 can detect that the current passing through the node 50 is less than the threshold current, thereby indicating an absence of a connection to a second powered device 14.

When the second powered device 16 connects to the first powered device 14, such connection causes the amount of current passing through the node 50 to increase, as described above. In response to such an increase, the control element 64 closes the gate 62, thereby allowing current to flow through the node 50 and through a detection resistor (RDETECT) 66 associated with the second powered device 16 and arranged in parallel with the resistors 38, 46 associated with the first and second devices 14, 16, respectively. Addition of the detection resistor 66 increases the current passing through the node 50. For example, the current measuring circuit 60 measures the current passing through the node 50 as Vref/RCLASS1+Vref/RCLASS2+Vref/RDETECT. In this case, when the detection circuitry 68 compares this current with a threshold current, the circuitry 68 can detect that the current passing through the node 50 is greater than the threshold current, thereby indicating the presence of a connection to a second powered device 14. As such, the detection circuitry can cause the classification circuit 14 to transmit a classification signal to the power source to request additional power.

While this invention has been particularly shown and described with references to preferred embodiments thereof, it will be understood by those skilled in the art that various changes in form and details may be made therein without departing from the spirit and scope of the invention as defined by the appended claims.

For example, FIG. 1 indicate that the system or network 10 includes a power source 12, a first powered device 14 and a second powered device 16 electrically coupled to the first powered device 14. In one embodiment, more than one modular powered device 16 can be electrically coupled to the first powered device 14. In such a configuration, the classification circuitry 20 can detect the presence of the additional modular devices 16 and transmit a classification signal 23 to the powered device based upon the additional power requirements required.

Additionally, the power source 12 is described as providing additional power to the first powered device 14 when the first powered device 14 detects electrical coupling of the second powered device 16 thereto. One of ordinary skill in the art will appreciate that the first powered device 14 can also detect decoupling of a modular powered device 16. Based upon such decoupling, the first powered device 14 can transmit a classification signal to the power source 12 requesting that the power source reclassify the power classification of the device 14 and provide a reduced amount of power for operation.

In another example, as described above, when the modular powered device 16 is attached to the first powered device 16 when the first powered device 16 is "on", the first powered device 14 can utilize an auto-negotiation procedure to request additional power from the power source 12. As described with respect to step 172 in FIG. 7, once the first powered device 14 detects attachment of the second powered device 16, the first powered device 14 can raise a "link down" flag and force the power source to recognize the "link down" flag in order to disable the connection. Such description is by way of example only. In one arrangement, a special mode may exist between the powered device 14 and the power source 12 on both sides of the link that is designed to take the link down physically. Typically, a link down without an explanation to the user may be a flag for a data transmission problem if no physical change was done to do so, or no permission was granted. For example, the mode can abort packet/signal transmission temporarily to negotiate power and restart auto-negotiation between the device 14 and source 12 without indicating that a link down has really taken place.

As indicated above, the first powered device 14 includes classification circuitry 20 that is configured to generate a classification signal 23 for transmission to the power source 12. Based upon the classification signal 23 generated, the power source 12 performs a powered device classification procedure and provides an appropriate amount of power to the first powered device 14. Such description is by way of example only. In one arrangement, the first powered device 14 can provide a signal that indicates that the first powered device is associated with two separate power classes (e.g., in the case where the device 14 is not IEEE 802.3af compatible). In such a case, the powered device 14 is free to use a lower power mode and can switch to a higher power mode anytime without warning. For example, the controller 13 of the power source 12 monitors the power on the device 14 in real time. The controller 13 is configured with an algorithm that allows the delivery of two different amounts of power during the classification procedure when the device 14 is being classified and no power is applied. When a higher power mode requirement is detected by the controller 13, the controller 13 can adjust the power budget for the power source 12 accordingly. Such a change in power can be accomplished by using a power adjustment procedure. For example, the powered device 14 can increasing the power to a pre-defined level within the higher power window for a number of times during a predefined time to signal the switchover. Similar mechanism can be used to signal a lowering of power or a shift down to a lower power level. In one arrangement, to activate power adjustment procedure (e.g., to ask for an increase or decrease in power) the first powered device 14 includes a switch, such as a pushbutton or a software switch, configured to activate the power adjustment procedure. In another arrangement, to the controller 13 monitors dc current associated with the first powered device 14 in real time. In such a case, the controller 13 can automatically activate the power adjustment procedure to increase or decrease the power supplied to the first powered device 14 based upon the monitored dc current (e.g. a change in current over time).

What is claimed is:

1. A method of applying inline power from power source equipment to powered devices via a communications medium, the method comprising:
    receiving a first classification signal from a first powered device via the communications medium, the first classification signal indicating a power class of the first powered device;
    allocating a first amount of power to the first powered device based on the first classification signal;
    receiving a second classification signal from the first powered device via the communications medium, the second classification signal indicating a combined power class of a combination of the first powered device and a second powered device coupled to the first powered device;
    allocating a second amount of power to the first powered device based on the second classification signal to reflect the power requirements of both the first powered device and the second powered device; and
    supplying power from the power source equipment to the first powered device and the second powered device in accordance with the allocated second amount of power;
    wherein the second classification signal is a modulated current signal, and further comprising the power source equipment decoding the modulated current signal; and
    wherein the step of allocating the first amount of power includes setting a maximum power threshold that the power source equipment is allowed to deliver to the first powered device, and wherein an actual amount of power supplied from the power source equipment to the first powered device is less than the maximum power threshold.

2. The method as recited in claim 1,
    wherein the maximum power threshold is a first maximum power threshold,
    wherein allocating the second amount of power includes setting a second maximum power threshold that the power source equipment is allowed to deliver to the first powered device for powering the first powered device and the second powered device, and
    wherein an actual amount of power supplied from the power source equipment for powering the first powered device and the second powered device is less than the second maximum power threshold.

3. The method as recited in claim 2, wherein the first maximum power threshold is less than the second maximum power threshold.

4. The method as recited in claim 1, wherein the first powered device is constructed and arranged to operate as power source equipment to the second powered device.

5. The method as recited in claim 1, wherein the second classification signal is a modulated under-current signal comprising current pulses that pulse current drawn from the first powered device below an undercurrent threshold.

6. The method as recited in claim 1, further comprising the power source equipment continuously monitoring the first powered device for detecting the second classification signal.

7. The method as recited in claim 1, wherein the first classification signal is indicative of a plurality of power classes each prescribing a maximum current threshold, the method further comprising:
    dynamically changing the allocated second amount of power responsive to the power supplied in the supplying step crossing the maximum current threshold of at least one of the plurality of power classes.

8. The method as recited in claim 7, wherein the supplying step includes monitoring the power supplied for powering the first powered device and the second powered device, and wherein the step of dynamically changing the allocated second amount of power is based on the monitored power supplied in the supplying step.

9. The method as recited in claim 1, wherein setting the maximum power threshold that the power source equipment is allowed to deliver to the first powered device includes:
    identifying a maximum power level at the input of the powered device based on the classification signal, the maximum power level at the input of the powered device being based on the IEEE 802.3af-2003 Power over Ethernet standard; and
    setting the maximum power threshold to the maximum power level at the input of the powered device.

10. A powered device for an inline power network, the powered device comprising:
    a first port for coupling the powered device to power source equipment;
    a second port for coupling the powered device to a modular device;
    a classification circuit coupled to the first port and to the second port, the classification circuit constructed and arranged (i) to output a classification signal, indicative of a power class of the powered device, to power source equipment via the first port, and (ii) to receive a connection signal, indicative of a coupling of the modular device to the powered device, from the modular device via the second port; and
    user circuitry constructed and arranged for receiving input from a user, the user circuitry being operable to disable power to the powered device and to direct the classification circuit to output to the power source equipment via the first port a classification signal indicative of a combined power class of the powered device and the modular device, wherein the classification signal is a modulated current signal;
    wherein the classification circuit is further constructed and arranged to receive an amount of power from the power source equipment based on the classification signal; and
    wherein receiving the amount of power includes setting a maximum power threshold that the powered device is allowed to receive from the power source equipment, and wherein an actual amount of power received by the powered device from the power source equipment is less than the maximum power threshold.

11. The powered device as recited in claim 10, wherein the user circuitry comprises a user-actuable switch.

12. The powered device as recited in claim 10, further comprising a display constructed and arranged for alerting a user to provide input to the user circuitry.

13. The powered device as recited in claim 10, wherein the classification circuit is constructed and arranged to communicate with the power source equipment using an auto-negotiation mechanism.

14. A method of powering a powered device coupled to a modular device, which receive power from power source equipment in an inline power network, the method comprising:
 operating a user-operable circuit disposed in one of the powered device and the modular device;
 outputting, responsive to an operation of the user-operable circuit, a classification signal to the power source equipment via the inline power network, the classification signal being indicative of a combined power class of the powered device and the modular device;
 receiving power, from the power source equipment through the inline power network, in accordance with the combined power class of the powered device and modular device; and
 powering both the powered device and the modular device with the received power;
 wherein the classification signal is a modulated current signal;
 wherein the method further comprises, prior to operating the user-operable circuit:
  receiving a prior classification signal from the powered device, the prior classification signal indicating a prior power class of the powered device; and
  allocating a prior amount of power to the powered device based on the prior classification signal;
 wherein allocating the prior amount of power includes setting a maximum power threshold that the power source equipment is allowed to deliver to the powered device, and wherein an actual amount of power supplied from the power source equipment to the powered device is less than the maximum power threshold.

15. The method as recited in claim 14, wherein the user-operable circuit is a switch in the powered device, the method further comprising temporarily disabling power to the powered device from the power source equipment responsive to a user activating the switch.

16. The method as recited in claim 14, wherein the step of operating the user-operable circuit comprises actuating a switch in the modular device, the method further comprising power cycling the powered device and/or the modular device responsive to actuation of the switch.

17. The method as recited in claim 14, wherein the step of operating the user-operable circuit comprises entering a code in the modular device.

18. The method as recited in claim 14, wherein the step of outputting the classification signal comprises outputting a signal indicative of a plurality of combined power classes of the powered device and the modular device.

19. The method as recited in claim 18, further comprising the powered device dynamically signaling the power source equipment to inform the power source equipment of a prior or expected change in combined power requirements of the powered device and modular device from one power class to another.

* * * * *